United States Patent
Jadidian et al.

(10) Patent No.: US 12,297,778 B2
(45) Date of Patent: May 13, 2025

(54) COMPONENTS HAVING COATING SYSTEMS DEFINED BY TILES SECURED THERETO, METHODS OF PRODUCING THE COMPONENTS, AND AIRCRAFT COMPRISING THE COMPONENTS

(71) Applicant: HONEYWELL INTERNATIONAL INC., Charlotte, NC (US)

(72) Inventors: Bahram Jadidian, Morris Plains, NJ (US); Kevin Blinn, Morris Plains, NJ (US); Mehrad Mehr, Morris Plains, NJ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 46 days.

(21) Appl. No.: 18/181,159

(22) Filed: Mar. 9, 2023

(65) Prior Publication Data

US 2024/0301832 A1   Sep. 12, 2024

(51) Int. Cl.
*F02C 7/24* (2006.01)
*B64D 27/10* (2006.01)
*F02C 6/20* (2006.01)

(52) U.S. Cl.
CPC ............... *F02C 7/24* (2013.01); *B64D 27/10* (2013.01); *F02C 6/20* (2013.01)

(58) Field of Classification Search
None
See application file for complete search history.

(56) References Cited

U.S. PATENT DOCUMENTS

| | | | |
|---|---|---|---|
| 7,291,407 B2 | 11/2007 | Merrill et al. | |
| 8,357,454 B2 | 1/2013 | Kulkarni et al. | |
| 8,999,457 B2 | 4/2015 | Kirby et al. | |
| 10,851,656 B2 | 12/2020 | Gong et al. | |
| 2006/0014029 A1 | 1/2006 | Saak et al. | |
| 2006/0280954 A1 | 12/2006 | Spitsberg et al. | |
| 2010/0260960 A1 | 10/2010 | Vance | |
| 2017/0138597 A1* | 5/2017 | Freeman | F01D 9/04 |
| 2022/0371967 A1 | 11/2022 | Li et al. | |
| 2023/0036472 A1 | 2/2023 | Downs et al. | |

FOREIGN PATENT DOCUMENTS

| | | | |
|---|---|---|---|
| CN | 101774787 A | * | 7/2010 |
| JP | 3117433 U | | 12/2000 |

OTHER PUBLICATIONS

Machine translation of CN101774787 A (Year: 2024).*

* cited by examiner

*Primary Examiner* — Alexander S Thomas
(74) *Attorney, Agent, or Firm* — Lorenz & Kopf LLP (57) ABSTRACT

Components of gas turbine engines, aircraft comprising the components, and methods of producing the components are provided. The component includes a surface, and a set of tiles secured to the surface at interfaces between the set of tiles and the surface and between each of the set of tiles. The set of tiles conform to the surface and in combination define a coating system on the surface that includes an environmental barrier coating and/or a thermal barrier coating.

20 Claims, 4 Drawing Sheets

COMPONENTS HAVING COATING SYSTEMS DEFINED BY TILES SECURED THERETO, METHODS OF PRODUCING THE COMPONENTS, AND AIRCRAFT COMPRISING THE COMPONENTS

STATEMENT REGARDING FEDERALLY SPONSORED RESEARCH OR DEVELOPMENT

This invention was made with Government support under FA865015D2504-FA865017F2001 awarded by the Air Force Research Laboratory (AFRL). The Government has certain rights in this invention.

TECHNICAL FIELD

The present invention generally relates to coating systems, and more particularly relates to components that include a plurality of tiles secured to surfaces thereof that in combination define coating systems on the components.

BACKGROUND

The aircraft industry's overall goal of hotter engine temperatures necessitates the use of advanced ceramics like silicon nitride and SiC/SiC composites in engine components such as shrouds. Despite the ability of such ceramics to withstand high temperatures, they require environmental barrier coatings (EBC) to survive water vapor in the combustion environment. In addition, the drive for even higher operating temperatures may require thermal barrier coatings (TBC) to enhance silicon-based ceramic component survivability. Compounding upon these issues is the complexity of manufacturing these ceramic components as well as what is required to properly build coating systems upon the surfaces of the ceramics. State-of-the-art application methods for coating systems typically require multiple rounds of process steps such as doctor blading, spraying, and firing, which leave an undesired number of opportunities for complications to arise.

Hence, there is a need for application methods for producing coating system on components that that have reduced complexity. Furthermore, other desirable features and characteristics of the present invention will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A component of a gas turbine engine is provided that includes a surface, and a set of tiles secured to the surface at interfaces between the set of tiles and the surface and between each of the set of tiles. The set of tiles conform to the surface and in combination define a coating system on the surface that includes an environmental barrier coating and/or a thermal barrier coating.

A method is provided for providing a coating system on a component of a gas turbine engine. The method comprises forming a set of tiles, and joining the set of tiles to a surface of the component by securing the tiles at interfaces between the set of tiles and the surface and between each of the set of tiles, wherein the set of tiles in combination define the coating system on the surface that includes an environmental barrier coating and/or a thermal barrier coating.

An aircraft is provided that includes a gas turbine engine having a component that includes a surface that includes a silicon-based ceramic material, and a set of tiles secured to the surface of the component at interfaces between the set of tiles and the surface of the component and between each of the set of tiles. The set of tiles conform to the surface of the component and in combination define a coating system on the surface of the component that includes at least one layer having a rare earth silicate material.

Furthermore, other desirable features and characteristics of the component, method, and the aircraft will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Broadly, embodiments of the present disclosure include a component that has a plurality of tiles secured to surfaces thereof that in combination define a coating system on the component. In various embodiments, the component may be configured for use in a high temperature environment. In various embodiments, the component may be configured to be installed in a turbine engine, and the coating system defined by the plurality of tiles may be a protective ceramic coating, such as an environmental barrier coating (EBC) and/or a thermal barrier coating (TBC).

Figure 1:
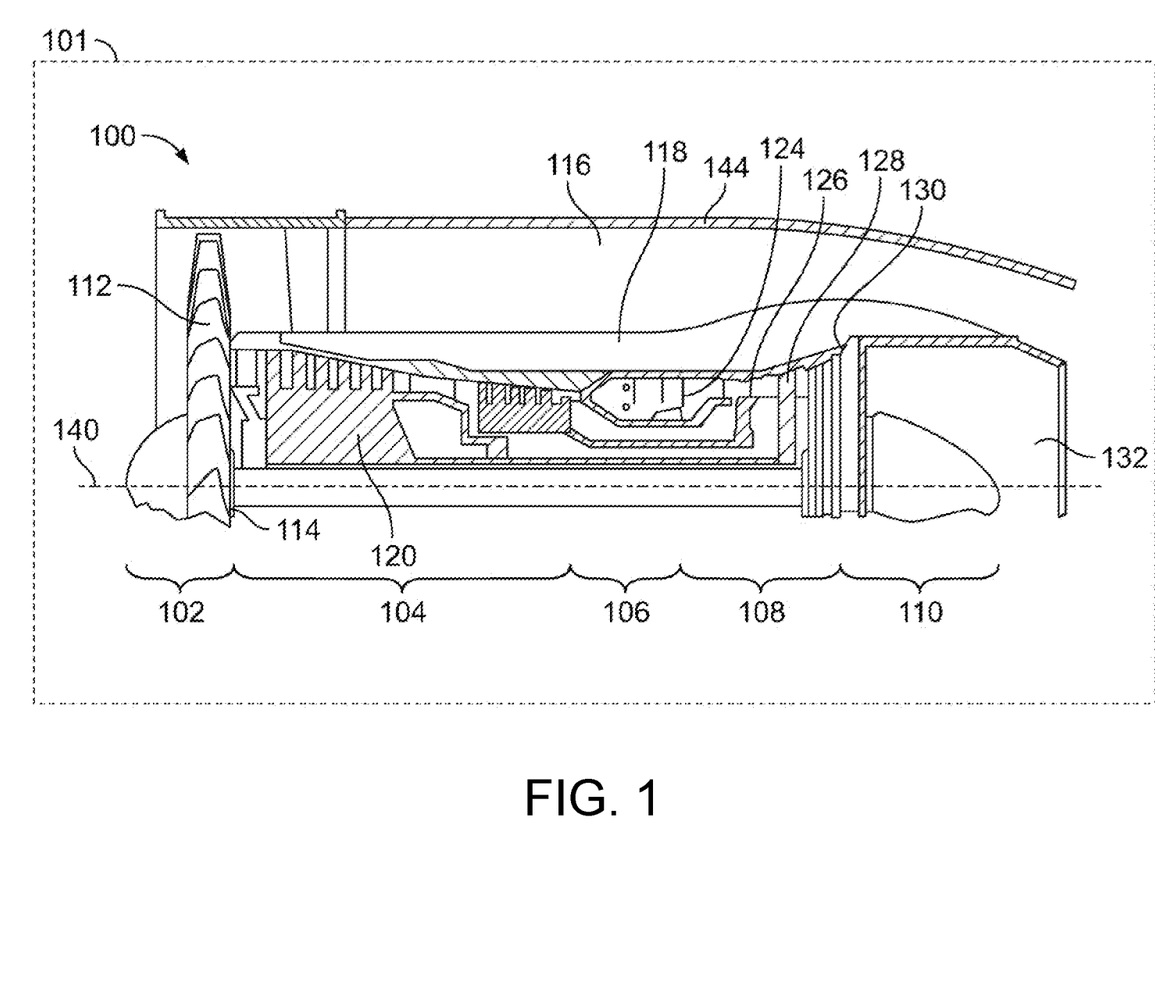
FIG. 1 is a schematic view of a gas turbine engine according to example embodiments of the present disclosure.

With reference to FIG. 1, a partial, cross-sectional view of an exemplary gas turbine engine 100 is shown with the remaining portion of the gas turbine engine 100 being substantially axisymmetric about a longitudinal axis 140, which also defines an axis of rotation for the gas turbine engine 100. In the depicted embodiment, the gas turbine engine 100 is an annular multi-spool turbofan gas turbine jet engine within an aircraft (represented schematically at 101), although features of the present disclosure may be included in other configurations, arrangements, and/or uses. For example, in other embodiments, the gas turbine engine 100 may assume the form of a non-propulsive engine, such as an Auxiliary Power Unit (APU) deployed onboard the aircraft 101, an industrial power generator, or other turbomachine.

In this example, with continued reference to FIG. 1, the gas turbine engine 100 includes a fan section 102, a compressor section 104, a combustor section 106, a turbine section 108, and an exhaust section 110. In one example, the fan section 102 includes a fan 112 mounted on a rotor 114 that draws air into the gas turbine engine 100 and compresses it. A fraction of the compressed air exhausted from the fan 112 is directed through the outer bypass duct 116 and the remaining fraction of air exhausted from the fan 112 is directed into the compressor section 104. The outer bypass duct 116 is generally defined by an outer casing 144 that is spaced apart from and surrounds an inner bypass duct 118.

In the embodiment of FIG. 1, the compressor section 104 includes one or more compressors 120. The number of compressors 120 in the compressor section 104 and the configuration thereof may vary. The one or more compressors 120 sequentially raise the pressure of the air and direct a majority of the high-pressure fluid or air into the combustor section 106. In the combustor section 106, which includes a combustion chamber 124, the high-pressure air is mixed with fuel and is combusted. The high-temperature combustion air or combustive gas flow is directed into the turbine section 108. In this example, the turbine section 108 includes three turbines disposed in axial flow series, namely, a high-pressure turbine 126, an intermediate pressure turbine 128, and a low-pressure turbine 130. However, it will be appreciated that the number of turbines, and/or the configurations thereof, may vary. In this embodiment, the high-temperature combusted air from the combustor section 106 expands through and rotates each turbine 126, 128, and 130. The combustive gas flow then exits the turbine section 108 for mixture with the cooler bypass airflow from the outer bypass duct 116 and is ultimately discharged from the gas turbine engine 100 through the exhaust section 132. As the turbines 126, 128, 130 rotate, each drives equipment in the gas turbine engine 100 via concentrically disposed shafts or spools.

The engine 100 may include at least one component 200 with a coated outer surface 204. The component 200 may be included in an area of the engine 100 subjected to high-temperature environments. Thus, the component 200 may be included in the combustor section 106, the turbine section 108, etc. In various embodiments, a blade, vane, shroud, combustor liner, or other component of the engine 100 may include the coated outer surface 204. It will be appreciated that the coated outer surface 204 may be included on a component of something other than a gas turbine engine 100 without departing from the scope of the present disclosure.

The coated outer surface 204 is defined by one or more layers of tiles 206 secured directly or indirectly (e.g., via underlying tiles 206) to surfaces of a substrate 216 (i.e., an underlying layer or body). The substrate 216 may be defined by a component body. The component body may define a majority of the component 200. The component body may have a variety of shapes without departing from the scope of the present disclosure. For example, the component body may be shroud-shaped, as partially shown in FIG. 2. The substrate 216 may include a substrate outer surface 218.

Figure 2:
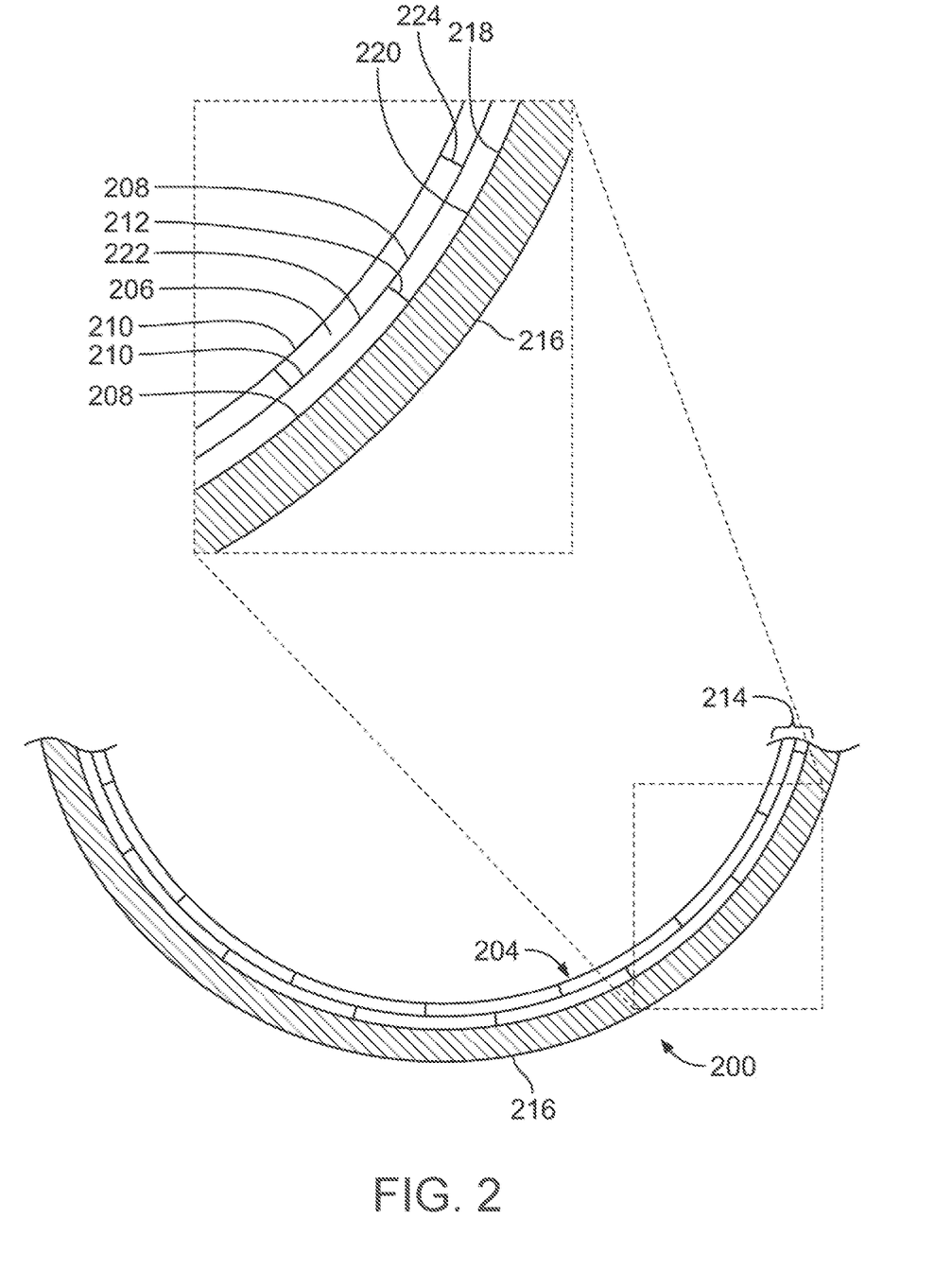
FIG. 2 is a schematic cross section of a coated outer surface of a first component of the gas turbine engine according to example embodiments of the present disclosure.

The tiles 206 may generally define a coating system 214 having one or more layers, each of which may include various materials, structures, shapes, and properties. In various embodiments, one or more layers of the coating system 214 are defined by corresponding layers of the tiles 206. For example, the coated outer surface 204 may include three layers of the tiles 206 with each of the layers defining a corresponding layer of the coating system 214. In various embodiments, one or more layers of the coating system 214 are defined by corresponding layers within a single layer of the tiles 206. That is, individual tiles 206 may include multiple layers with different properties configured to define corresponding layers of the coating system 214. For example, the coated outer surface 204 may include one layer of tiles 206, each of which include three layers each defining a corresponding layer of the coating system 214.

The tiles 206 are prefabricated and shaped such that they can fit together and form the coated outer surface 204 that conforms to the surface of the substrate 216. For convenience, each of the tiles 206 are referred to herein as including a tile inner surface 208 configured to face toward the substrate 216, a tile outer surface 210 configured to face away from the substrate 216, and edges 212 located between adjacent tiles 206. Regions between the tiles 206 and/or the substrate 216 are referred to herein as interfaces which may be categorized as tile-to-substrate interfaces 220 referring to interfaces between the tile inner surfaces 208 of the tiles 206 and the substrate outer surface 218 of the substrate 216, tile-to-tile interfaces 222 referring to interfaces between the tile inner surfaces 208 of one layer of the tiles 206 and tile outer surfaces 210 of another layer of the tiles 206, and edge-to-edge interfaces 224 referring to interfaces between edges 212 of adjacent tiles 206 within a single layer of the tiles 206.

When secured to the substrate 216, the shapes and/or positions of the tiles 206 define a pattern. Individual tiles 206 may have unique shapes and/or positions relative to one or more of the other tiles 206. As such, patterns of the tiles 206 when secured to the substrate 216 may vary. In various embodiments, the shapes of the individual tiles 206 relative to their location on the substrate 216, and/or the pattern of the tiles 206 when secured to the substrate 216 may be configured to promote an integrity of the coated outer surface 204 during operation of gas turbine engine 100. For example, the shape of individual tiles 206 and/or the pattern of the tiles 206 may be configured to reduce the likelihood of delamination resulting from rotation of the component 200, exposure to high temperatures and/or pressures, and/or exposure to other operating conditions.

In various embodiments, the coated outer surface 204 includes more than one layer of the tiles 206, and the pattern of each of the layers of the tiles 206 is different. That is, the shapes and/or the positions of the tiles 206 within one layer may be different than the shapes and/or positions of tiles 206 in another layer. As such, the edge-to-edge interfaces 224 of the tiles 206 of one layer may not be aligned (relative to the underlying substrate 216) with those of another layer. In various embodiments, the layers of the tiles 206 are configured such that the tile inner surfaces 208 of the tiles 206 in one or more overlying layers cover the edge-to-edge interfaces 224 of one or more underlying layers.

In various embodiments, the tiles 206 within a layer thereof may have interlocking features and the layer of tiles 206 may be assembled in an interlocking manner. That is, adjacent tiles 206 may be oriented relative to each other in a manner such that the relative motion therebetween is constrained.

The tiles 206 may be secured to the substrate 216 and each other with a bonding or joining compound located at the interfaces therebetween. The joining compound may include various materials and may be configured to secure the tiles 206 using various mechanisms. In various embodiments, the joining compound may include a paste comprising a carrier fluid or material, a primary material, a sintering aid, and optionally other components. In such embodiments, the interfaces 220, 222, and/or 224 may be filled with the joining compound. Subsequently, the joining compound may be dried to remove the carrier fluid or material, and then fired to cause sintering thereof such that the primary material forms a solid material bonding the adjacent tiles 206 and the tiles 206 to the substrate 216 or substrate outer surface 218. In various embodiments, the primary material of the joining compound may have a composition similar to, the same as, or compatible with (e.g., similar coefficients of thermal expansion) one or more adjacent tiles 206 and/or substrate outer surface 218.

Figure 3:
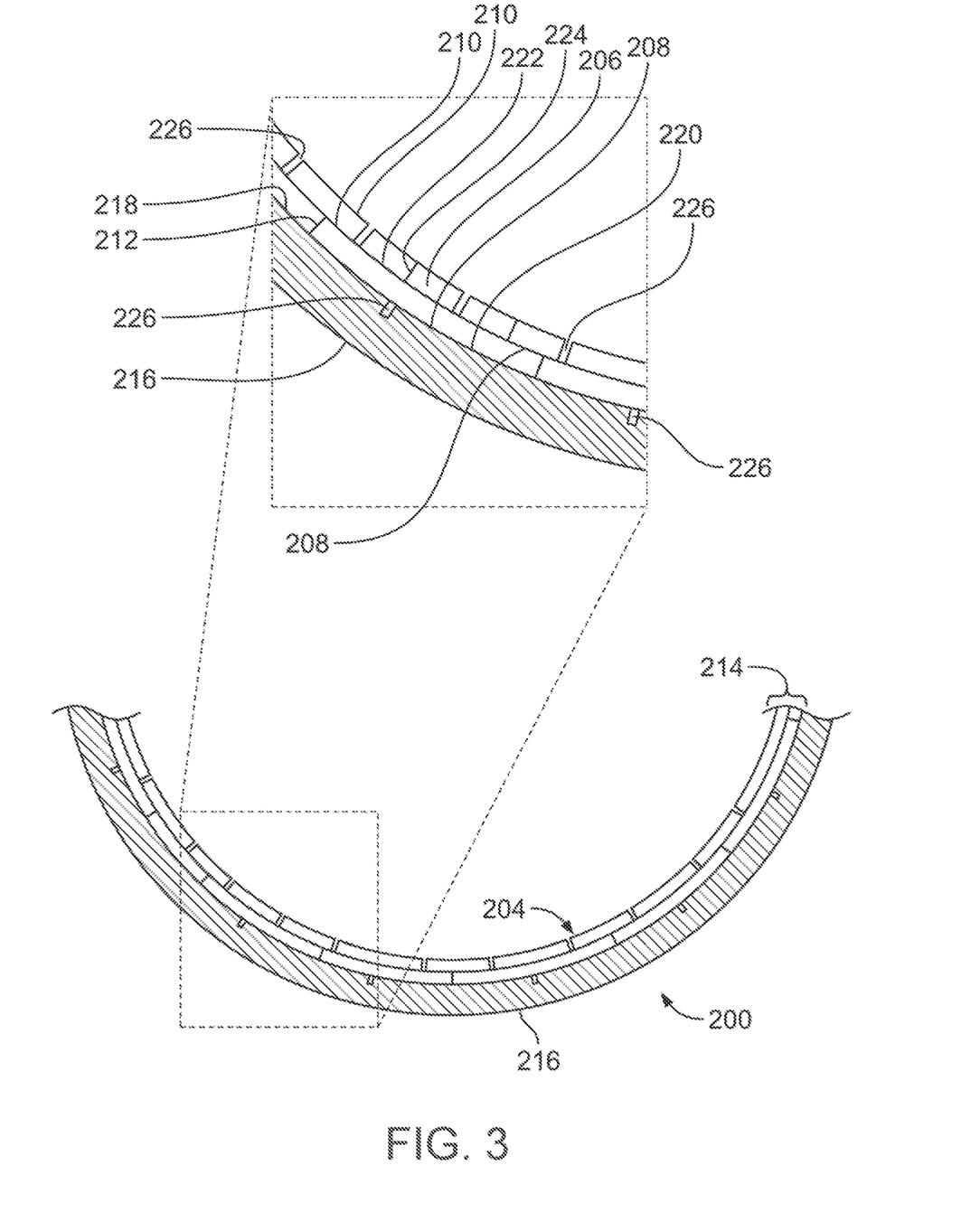
FIG. 3 is a schematic cross section of a coated outer surface of a second component of the gas turbine engine according to example embodiments of the present disclosure.
Figure 4:
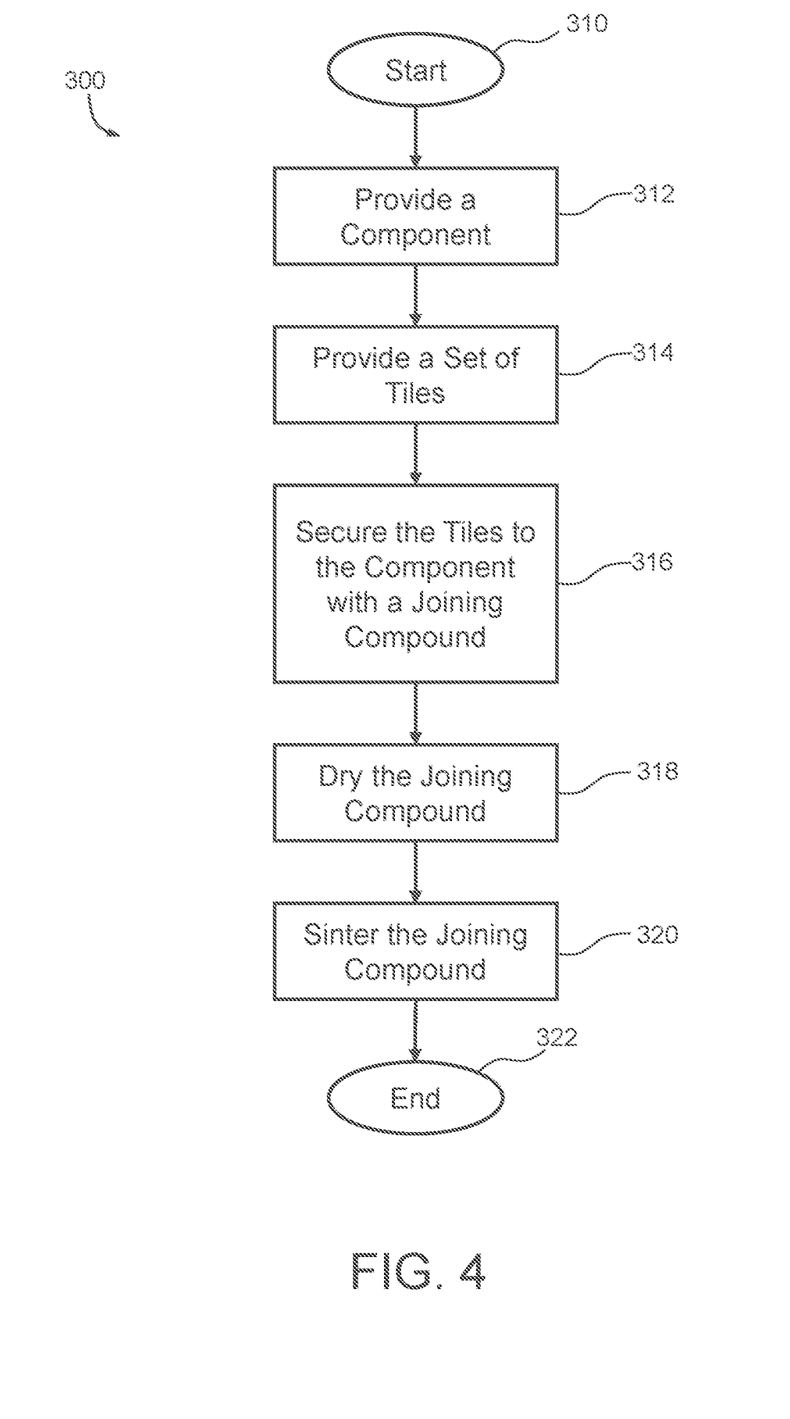
FIG. 4 is a flowchart illustrating certain aspects of a method for producing a coating system on the component according to example embodiments of the present disclosure.

In various embodiments, the tiles 206 and/or the interfaces 220, 222, and/or 224 may be configured to reduce stress within the coating system 214 resulting from operation of the gas turbine engine 100. For example, the tiles 206 may have features that provide some amount of relative motion therebetween and/or between the substrate 216 and the tiles 206. In addition, or as an alternative, the interfaces 220, 222, and/or 224 may include gaps 226 that provide for some amount of relative motion between the adjacent tiles 206 and/or the tiles 206 and the substrate 216. For example, FIG. 3 present an example wherein the interfaces 220 and 224 include gaps 226 that allow for relative movement between the adjacent tiles 206 and/or the tiles 206 and the substrate 216 such as due to thermal expansion and contraction. In such embodiments, the gaps 226 may vary in size, shape, location, and quantity.

The individual tiles 206 and the layers of tiles 206 may have various thicknesses and thereby provide for coating systems 214 having various thicknesses. In various embodiments, a thickness of the coating system 214, as measured along a dimension normal to the surfaces of the substrate 216 to the tile outer surfaces 210 of outermost tiles 206, may be about 50 μm to about 2.5 mm, such as about 250 μm to about 750 μm. In various embodiments, a thickness of the individual tiles 206 may be about 20 μm to about 900 μm, such as about 75 μm to about 150 μm. In various embodiments, a thickness of the interfaces 220, 222, and/or 224 may be about 5 μm to about 100 μm, such as about 10 μm to about 25 μm.

The substrate 216, the tiles 206, and thus the coating system 214, and the joining compound may include a variety of materials. In various embodiments, the component body and, thus the substrate 216, may be constructed of a ceramic material. The substrate 216 may include or be a monolithic ceramic or a ceramic matrix composite. A ceramic is an inorganic solid that may include metals, non-metals, or metalloid atoms primarily held together with ionic and/or covalent bonds. Ceramics may be crystalline, semi-crystalline, partially crystalline, or amorphous. The substrate 216 may include ceramic material throughout, such that the substrate 216 is essentially 100 percent ceramic. Alternatively, the substrate 216 may be defined as a substrate 216 that includes a ceramic coating disposed over a non-ceramic (e.g., metallic) core. The substrate 216 is not particularly limited in size, dimensions, etc.

The substrate 216 may be or include any ceramic known in the art. For example, the substrate 216 may be or include silicon nitride, silicon carbide, silicon-carbide-silicon carbide composites, silicon oxynitride, SiAlON materials (materials that include silicon, aluminum, oxygen, and nitrogen), silicon dioxide, and combinations thereof. In other embodiments, the substrate 216 may be or include silicon nitride, silicon carbide, silicon-carbide-silicon carbide composites, or combinations thereof. In various embodiments, the substrate 216 may be or include from about 50 to about 100 weight percent, or from about 80 to about 100 weight percent, or from about 99 to about 100 weight percent of silicon nitride, silicon carbide, silicon oxynitride, SiAlON materials, silicon dioxide, and combinations thereof. In various non-limiting embodiments, all values and ranges of values including and between those set forth above are hereby expressly contemplated for use herein.

The coating system 214 defined by the plurality of tiles 206 may include one or more layers including, but not limited to, an environmental barrier coating (EBC) and/or a thermal barrier coating (TBC). The EBC may serve as a barrier between the substrate 216 and high temperature air or steam when operating in conditions wherein water vapor becomes a reactive species and causes erosion. The TBC may have low thermal conductivity for thermally protecting the underlying EBC and the substrate 216. The EBC and the TBC may each include one or more layers.

The EBC and the TBC may be made from a variety of materials without departing from the scope of the present disclosure. In various embodiments, the EBC and/or the TBC may include a rare earth silicate that may be or include at least one rare earth monosilicate (e.g., $RE_2SiO_5$, where RE is a rare earth element), at least one rare earth disilicate (e.g., $RE_2Si_2O_7$, where RE is a rare earth element), or combinations thereof. The rare earth element may include at least one of Lu (lutetium), Yb (ytterbium), Tm (thulium), Er (erbium), Ho (holmium), Dy (dysprosium), Tb (terbium), Gd (gadolinium), Eu (europium), Sm (samarium), Pm (promethium), Nd (neodymium), Pr (praseodymium), Ce (cerium), La (lanthanum), Y (yttrium), or Sc (scandium). In various embodiments, the rare earth silicate is $Y_2SiO_5$, $Gd_2SiO_5$, $Er_2SiO_5$, $Yb_2SiO_5$, $Lu_2SiO_5$, $Y_2Si_2O_7$, $Gd_2Si_2O_7$, $Er_2Si_2O_7$, $Yb_2Si_2O_7$, or $Lu_2Si_2O_7$, or combinations thereof. In a nonlimiting example, the substrate 216 includes a silicon-based ceramic material, the EBC includes ytterbium monosilicate (YbMS), the TBC includes ytterbium disilicate (YbDS), and the paste includes ytterbium disilicate (YbDS) as the primary material and alumina as the sintering aid.

In various embodiments, the layers of the coating system 214 may each have a dense microstructure, a columnar microstructure, or a combination of dense and columnar microstructures. A dense microstructure may be more effective in preventing the infiltration of environmental contaminants (e.g., steam), while a columnar microstructure may be more strain tolerant during thermal cycling. In various embodiments, a combination of dense and columnar microstructures may be more effective in preventing the infiltration of environmental contaminants than a fully columnar microstructure while being more strain tolerant during thermal cycling than a fully dense microstructure. In various embodiments, the dense microstructures may have a porosity of between about 5 to 10 percent and the columnar microstructures may have a porosity of about 5 to about 50 percent. In various embodiments, the layers of the coating system 214 have microstructures that transition from dense to columnar. For example, the EBC may have a porosity of about 10 percent, and the TBC may have one or more layers that transition from a porosity of about 20 percent to a porosity of about 50 percent. Preferably, the porosity of the layers of the coating system 214 is closed.

The layers of the coating system 214 are not particularly limited in size, thickness, or other dimensions. In various embodiments, one or more of the layers of the coating system 214 may have a thickness of from about 25 µm to about 1 mm FIG. 3 is a flow chart illustrating an exemplary method 300 for forming the coating system 214. The method 300 may start at 310. At 312, the method 300 may include providing the substrate 216. The step of providing the substrate 216 may include various processes of manufacturing the substrate 216 (e.g., casting, machining, etc.) and/or preparing the substrate 216 for forming the coating system 214 thereon (e.g., etching, cleaning, etc.).

At 314, the method 300 includes providing a set of the tiles 206. The step of providing the tiles 206 may include various processes of manufacturing the tiles 206 and/or preparing the tiles 206 for application to the substrate 216 (e.g., etching, cleaning, etc.). Notably, since the tiles 206 may be individually manufactured prior to application to the substrate 216, various processes and/or processing parameters may be used that may not be possible or practical by conventional processes typically used for forming coating systems on components. For example, the tiles 206 may be produced using techniques such as casting, machining, and firing. Further, treatments may be performed on the tiles 206 that include, for example, temperatures and/or pressures in excess of those suitable for the substrate 216. In various embodiments, one or more debinding and/or HIP processes may be performed on the tiles 206. In various embodiments, the tiles 206 may be produced from slurries and/or pastes may include powders of a rare earth disilicate and/or a rare earth monosilicate. In some embodiments, the powders have submicron particles sizes, such as 0.02 to 20 µm.

At 316, the method 300 includes applying the joining compound as a slurry or paste on the substrate 216. Exemplary methods for applying the joining compound to the substrate 216 may include doctor blading, spraying, and dipping. Once the joining compound has been applied, the tiles 206 may be applied to the surfaces coated with the joining compound to define a first layer of the tiles 206. These steps may be repeated one or more times to apply one or more additional layers of the tiles 206 overlying the first layer. For example, the joining compound may be applied onto the tile outer surfaces 210 of the first layer of the tiles 206. Additional tiles 206 may then be fixed with the joining compound to the first layer to define a second layer of the tiles 206.

At 318, the method 300 includes drying the joining compound on the substrate 216. Optionally, debinding and/or HIP processes may be performed on the substrate 216 and the applied joining compound. The substrate 216 may be placed into a furnace, an isostatic press (HIP) furnace, or other heating system having an inert gas (such as helium, neon, argon, krypton, xenon, or nitrogen) environment therein. A heat treatment and/or HIP process may be performed to apply heat and, optionally, pressure on the substrate 216. This may cause voids in the applied joining compound to collapse under the differential pressure and surfaces of the voids to diffusion bond together to effectively eliminate the defects therebetween. If the applied joining compound includes a binder, the debinding process may be performed to remove (e.g., burning off) all or a portion of the binder that is present. The drying process and the optional debinding and/or HIP processes are not particularly limited relative to time, temperature, or pressure and these parameters may be chosen by one of skill in the art.

At 320, the method 300 includes performing a sintering process to densify and/or crystallize the applied joining compound to secure the tiles 206 to the substrate 216 and/or underlying layers of the tiles 206. The sintering process is not particularly limited relative to time, temperature, or pressure and these parameters may be chosen by one of skill in the art. However, in some embodiments, the sintering process may be performed at temperatures below those typical to production of similar coated components since the tiles 206 have already been produced. In various embodiments, the sintering process may be performed at a temperature of about 1700° C. or less, such as about 1400° C. to 1700° C., about 1450° C. to 1650° C., about 1500° C. to 1550° C., or about 1520° C. The method 300 may end at 322.

In various embodiments, the component body and, thus the substrate 216, may be provided in a manner similar to the process described above for the production of the coating system 214. That is, the substrate 216 may be produced as a plurality of segments each being produced (e.g., casting, machining, etc.) and prepared (e.g., etching, cleaning, etc.) prior to assembly. The individual segments may be fixed to each other with a joining compound suitable for the substrate 216. For example, such joining compound may include a primary component the same as, similar to, or compatible with the material of the segments. Once assembled, drying, debinding, HIP, and/or sintering processes may be performed to result in the substrate 216.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodi-

What is claimed is:

1. A component for a gas turbine engine, comprising:
a surface; and
a set of tiles secured to the surface at first interfaces between the set of tiles and the surface and secured at second interfaces between each of the set of tiles, wherein the set of tiles conform to the surface, wherein the set of tiles in combination define a coating system on the surface that includes an environmental barrier coating and/or a thermal barrier coating, wherein the surface includes a silicon-based ceramic material and the set of tiles include one or more rare earth silicate materials, wherein gaps are provided in at least some of the first interfaces between the set of tiles and the surface that are configured to provide for relative movement between the set of tiles and the surface and thereby provide stress relief to the coating system.

2. The component of claim 1, wherein the set of tiles are formed prior to being secured to the surface by casting and firing processes.

3. The component of claim 1, wherein the set of tiles interlock with each other at the second interfaces therebetween.

4. The component of claim 1, wherein the set of tiles are secured to the surface at the first interfaces with a joining compound that has been bonded to the surface and the set of tiles with a sintering process.

5. The component of claim 4, wherein the sintered joining compound includes one or more rare earth silicate materials.

6. The component of claim 1, wherein the set of tiles includes a first group of the set of tiles secured directly to the surface at the first interfaces to define a first layer of the coating system, and a second group of the set of tiles secured directly to the first group at third interfaces to define a second layer of the coating system, wherein the second group overlays the first group such that the third interfaces between the first group of the set of tiles and the second group of the set of tiles are covered by the second group of the set of tiles.

7. The component of claim 6, wherein gaps are provided in at least some of the third interfaces between the first group of the set of tiles and the second group of the set of tiles that are configured to provide for relative movement between adjacent tiles of the first group and the second group and thereby provide stress relief to the coating system.

8. The component of claim 1, wherein gaps are provided in at least some of the second interfaces between the set of tiles configured to provide for relative movement between adjacent tiles of the set of tiles and thereby provide stress relief to the coating system.

9. A method for providing a coating system on a component of a gas turbine engine, the method comprising:
forming a set of tiles; and
joining the set of tiles to a surface of the component by securing the tiles at first interfaces between the set of tiles and the surface and securing the tiles at second interfaces between each of the set of tiles, wherein the set of tiles in combination define the coating system on the surface that includes an environmental barrier coating and/or a thermal barrier coating, wherein the surface of the component includes a silicon-based ceramic material and the set of tiles include one or more rare earth silicate materials; and
providing gaps in at least some of the first interfaces between the set of tiles and the surface of the component that are configured to provide for relative movement between the set of tiles and the surface and thereby provide stress relief to the coating system.

10. The method of claim 9, wherein forming the set of tiles includes casting and firing the set of tiles.

11. The method of claim 9, wherein the set of tiles interlock with each other at the second interfaces therebetween and conform to the surface of the component.

12. The method of claim 9, wherein joining the set of tiles to the surface of the component includes:
applying a joining compound to surfaces of the set of tiles, the joining compound including a sintering aid;
applying the set of tiles to the surface of the component such that the joining compound contacts the surface of the component;
drying the joining compound; and
heat treating the component with the set of tiles thereon to sinter the joining compound at the first interfaces between the set of tiles and the surface of the component and at the second interfaces between the set of tiles.

13. The method of claim 12, wherein the joining compound includes one or more rare earth silicate materials in a carrier medium.

14. The method of claim 9, wherein joining the set of tiles to the surfaces includes:
joining a first group of the set of tiles to the surface of the component at the first interfaces to define a first layer of the coating system; and
joining a second group of the set of tiles to the first group at third interfaces to define a second layer of the coating system, wherein the second group overlays the first group such that the third interfaces between the first group of the set of tiles and the second group of the set of tiles are covered by the second group of the set of tiles.

15. The method of claim 9, further comprising providing gaps in at least some of the second interfaces between the set of tiles configured to provide for relative movement between adjacent tiles of the set of tiles and thereby provide stress relief to the coating system.

16. An aircraft that includes a gas turbine engine, the aircraft comprising:
a component of the gas turbine engine that includes a surface that includes a silicon-based ceramic material; and
a set of tiles secured to the surface of the component at first interfaces between the set of tiles and the surface of the component and secured at second interfaces between each of the set of tiles, wherein the set of tiles conform to the surface of the component, wherein the set of tiles in combination define a coating system on the surface of the component that includes an environmental barrier coating and/or a thermal barrier coating, wherein the coating system includes at least one layer having a rare earth silicate material, wherein gaps are provided in at least some of the first interfaces between the set of tiles and the surface that are configured to provide for relative movement between the set of tiles and the surface and thereby provide stress relief to the coating system.

17. The aircraft of claim 16, wherein the set of tiles are secured to the surface at the first interfaces with a joining compound that has been bonded to the surface and the set of tiles with a sintering process, wherein the sintered joining compound includes one or more rare earth silicate materials.

18. The aircraft of claim 16, wherein the set of tiles includes a first group of the set of tiles secured directly to the surface at the first interfaces to define a first layer of the coating system, and a second group of the set of tiles secured directly to the first group at third interfaces to define a second layer of the coating system, wherein the second group overlays the first group such that the third interfaces between the first group of the set of tiles and the second group of the set of tiles are covered by the second group of the set of tiles.

19. The aircraft of claim 16, wherein gaps are provided in at least some of the second interfaces between the set of tiles configured to provide for relative movement between adjacent tiles of the set of tiles and thereby provide stress relief to the coating system.

20. The aircraft of claim 18, wherein gaps are provided in at least some of the third interfaces between the first group of the set of tiles and the second group of the set of tiles that are configured to provide for relative movement between adjacent tiles of the first group and the second group and thereby provide stress relief to the coating system.

* * * * *